United States Patent
Meyerzon et al.

(10) Patent No.: US 7,499,919 B2
(45) Date of Patent: Mar. 3, 2009

(54) RANKING FUNCTIONS USING DOCUMENT USAGE STATISTICS

(75) Inventors: Dmitriy Meyerzon, Bellevue, WA (US); Hugo Zaragoza, Cambridge (GB); Kyle Peltonen, Issaquah, WA (US); Andrew DeBruyne, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 325 days.

(21) Appl. No.: 11/231,955

(22) Filed: Sep. 21, 2005

(65) Prior Publication Data
US 2007/0067284 A1    Mar. 22, 2007

(51) Int. Cl.
*G06F 17/30* (2006.01)
(52) U.S. Cl. .................. 707/3; 707/2; 707/7; 707/8; 707/10
(58) Field of Classification Search .............. 707/1–10, 707/100–104.1, 200–206
See application file for complete search history.

(56) References Cited

U.S. PATENT DOCUMENTS

| | | | |
|---|---|---|---|
| 6,272,507 | B1 | 8/2001 | Pirolli et al. |
| 2002/0026390 | A1 | 2/2002 | Ulenas et al. |
| 2003/0046389 | A1 | 3/2003 | Thieme |
| 2004/0260695 | A1 | 12/2004 | Brill |
| 2005/0210079 | A1* | 9/2005 | Edlund et al. ............... 707/204 |

OTHER PUBLICATIONS

International Search Report dated Jan. 16, 2007 for Application No. PCT/US2006/037206, 10 pages.

* cited by examiner

*Primary Examiner*—Isaac M Woo (57) ABSTRACT

Methods of providing a document relevance score to a document on a network are disclosed. Computer readable medium having stored thereon computer-executable instructions for performing a method of providing a document relevance score to a document on a network are also disclosed. Further, computing systems containing at least one application module, wherein the at least one application module comprises application code for performing methods of providing a document relevance score to a document on a network are disclosed.

14 Claims, 4 Drawing Sheets

RANKING FUNCTIONS USING DOCUMENT USAGE STATISTICS

BACKGROUND

Ranking functions that rank documents according to their relevance to a given search query are known. Efforts continue in the art to develop ranking functions that provide better search results for a given search query compared to search results generated by search engines using known ranking functions.

SUMMARY

Described herein are, among other things, various technologies for determining a document relevance score for a given document on a network. The document relevance score is generated via a ranking function that comprises one or more query-independent components, wherein at least one query-independent component includes a usage parameter that takes into account actual document usage data maintained and stored on a web server for one or more documents on the network. The ranking functions may be used by a search engine to rank multiple documents in order (typically, in descending order) based on the document relevance scores of the multiple documents.

This Summary is provided to generally introduce the reader to one or more select concepts describe below in the "Detailed Description" section in a simplified form. This Summary is not intended to identify key and/or required features of the claimed subject matter.

DETAILED DESCRIPTION

To promote an understanding of the principles of the methods and processes disclosed herein, descriptions of specific embodiments follow and specific language is used to describe the specific embodiments. It will nevertheless be understood that no limitation of the scope of the disclosed methods and processes is intended by the use of specific language. Alterations, further modifications, and such further applications of the principles of the disclosed methods and processes discussed are contemplated as would normally occur to one ordinarily skilled in the art to which the disclosed methods and processes pertains.

Methods of determining a document relevance score for documents on a network are disclosed. Each document relevance score is calculated using a ranking function that desirably contains one or more query-independent components (e.g., a function component that that does not depend on a given search query or search query term), one or more query-dependent components (e.g., a function component that depends on the specifics of a given search query or search query term), or a combination thereof. The document relevance scores determined by the ranking function may be used to rank documents within a network space (e.g., a corporate intranet space) according to each document relevance score. An exemplary search process in which the disclosed methods may be used is shown as exemplary process 10 in FIG. 1.

Figure 1:
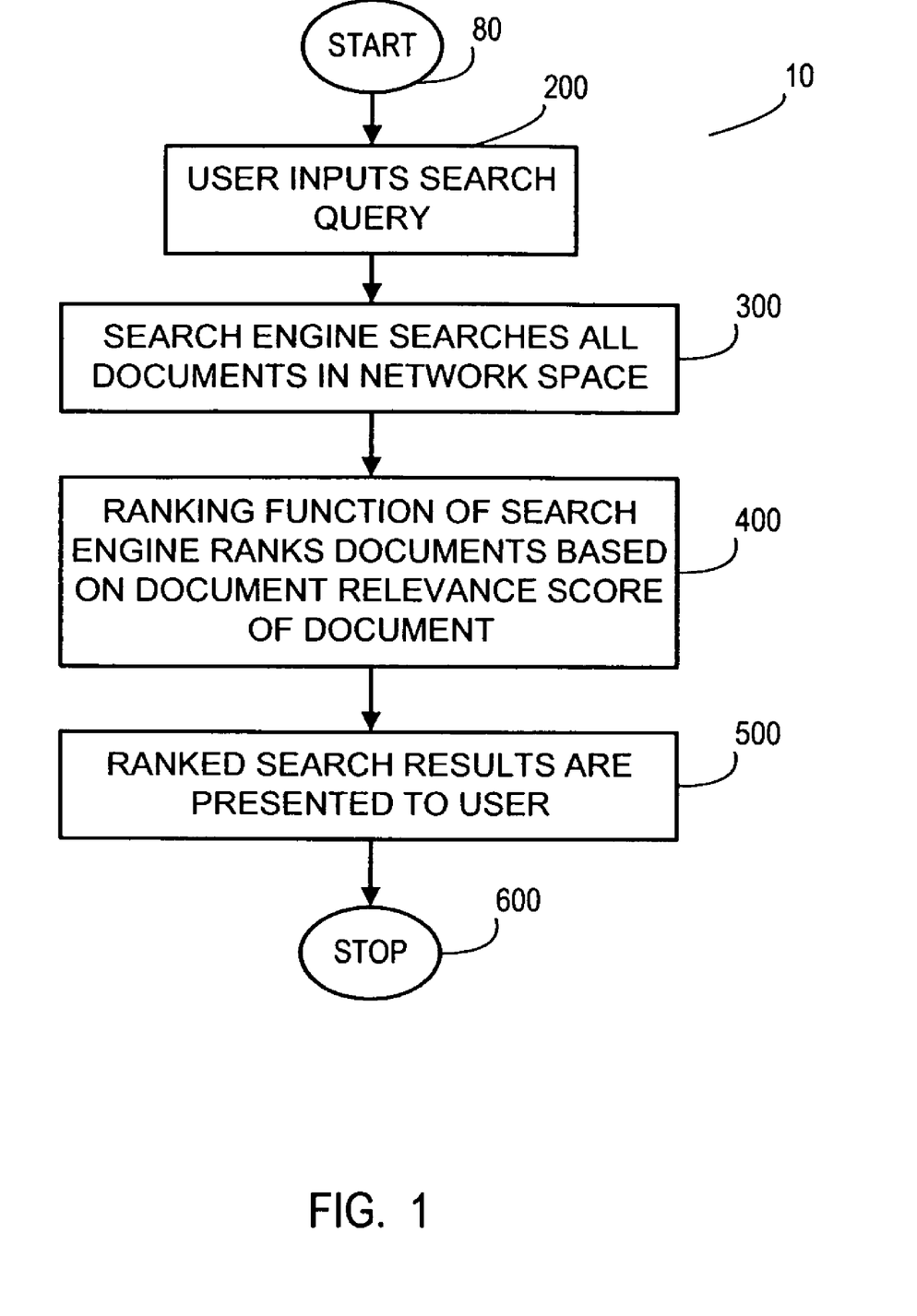
FIG. 1 represents an exemplary logic flow diagram showing exemplary steps in a method of producing ranked search results in response to a search query inputted by a user.

FIG. 1 depicts exemplary search process 10, which starts with process step 80, wherein a user inputs a search query. From step 80, exemplary search process 10 proceeds to step 200, wherein a search engine searches all documents within a network space for one or more terms of the search query. From step 200, exemplary search process 10 proceeds to step 300, wherein a ranking function of the search engine ranks the documents within the network space based on the relevance score of each document, the document relevance score being based on one or more query-independent components, one or more query-dependent components, or a combination thereof. From step 300, exemplary search process 10 proceeds to step 400, wherein ranked search results are presented to the user, typically in descending order, identifying documents within the network space that are most relevant to the search query.

As discussed in more detail below, in some exemplary methods of determining a document relevance score, at least one query-independent component of a ranking function used to determine a document relevance score takes into account "document usage data" or "document usage statistics" related to actual usage of one or more documents within a network space by one or more users. The document usage data and/or statistics is generated and stored by application code on a web server, which is separate from a given search engine. For example, document usage data may be maintained by a web site so that each time a user requests a URL, the server updates a usage counter. The usage counter may maintain document-related data obtained for a given time interval, such as last week, last month, last year, or the lifetime of a given document or set of documents. Application code may be used to obtain the usage data from the web site via (i) a special application programming interface (API), (ii) a web service request, or (iii) by requesting an administration web page that returns usage data for every URL on the web site.

Specific web sites may be used to generate and maintain usage data within a network space, as well as store the usage data in a local or remote storage system. Suitable web sites for generating, maintaining and storing usage data of documents within a network space include, but are not limited to, WINDOWS® SHAREPOINT® Services sites.

The disclosed methods of determining a document relevance score may further utilize a ranking function that comprises one or more additional query-independent components. Suitable additional query-independent components include, but are not limited to, a query-independent component that takes into account a click distance for each document within a network space as described in U.S. patent application Ser. No. 10/955,983 entitled "SYSTEM AND METHOD FOR RANKING SEARCH RESULTS USING CLICK DISTANCE" filed on Aug. 30, 2004, a query-independent component that takes into account a biased click distance for each document within a network space as described in U.S. patent application Ser. No. 11/206,286 entitled "RANKING FUNCTIONS USING A BIASED CLICK DISTANCE OF A DOCUMENT ON A NETWORK" filed on Aug. 15, 2005, and a query-independent component that takes into account the URL for each document within a network space as described in U.S. patent application Ser. No. 10/955,983 entitled "SYSTEM AND METHOD FOR RANKING SEARCH RESULTS USING CLICK DISTANCE" filed on Aug. 30, 2004. The subject matter of each of the above-mentioned U.S. patent applications, which are assigned to the assignee of the present patent application, is hereby incorporated by reference in its entirety.

In yet a further exemplary embodiment, the disclosed methods of determining a document relevance score utilizes a ranking function that comprises at least one query-independent component, which includes both the above-described document usage parameter and one or more of the above-described additional query-independent components.

The document relevance score may be used to rank documents within a network space. For example, a method of ranking documents on a network may comprise the steps of determining a document relevance score for each document on the network using the above-described method; and ranking the documents in a desired order (typically, in descending order) based on the document relevance scores of each document.

The document relevance score may also be used to rank search results of a search query. For example, a method of ranking search results of a search query may comprise the steps of determining a document relevance score for each document in the search results of a search query using the above-described method, and ranking the documents in a desired order (typically, in descending order) based on the document relevance scores of each document.

Application programs using the methods disclosed herein may be loaded and executed on a variety of computer systems comprising a variety of hardware components. An exemplary computer system and exemplary operating environment for practicing the methods disclosed herein is described below.

Exemplary Operating Environment

Figure 2:
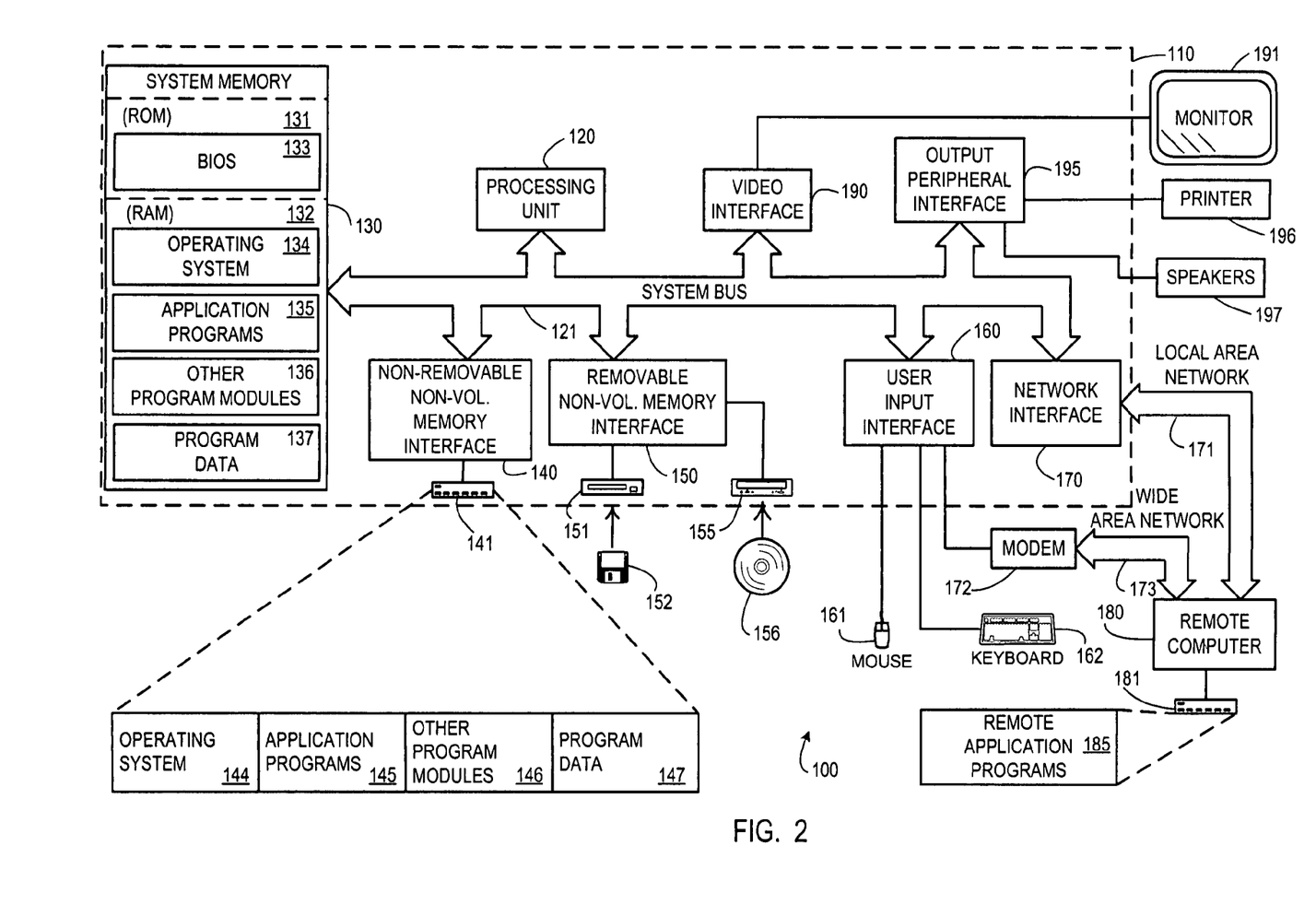
FIG. 2 is a block diagram of some of the primary components of an exemplary operating environment for implementation of the methods and processes disclosed herein.

FIG. 2 illustrates an example of a suitable computing system environment 100 on which the methods disclosed herein may be implemented. The computing system environment 100 is only one example of a suitable computing environment and is not intended to suggest any limitation as to the scope of use or functionality of the methods disclosed herein. Neither should the computing environment 100 be interpreted as having any dependency or requirement relating to any one or combination of components illustrated in the exemplary operating environment 100.

The methods disclosed herein are operational with numerous other general purpose or special purpose computing system environments or configurations. Examples of well-known computing systems, environments, and/or configurations that may be suitable for use with the methods disclosed herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The methods and processes disclosed herein may be described in the general context of computer-executable instructions, such as program modules, being executed by a computer. Generally, program modules include routines, programs, objects, components, data structures, etc. that perform particular tasks or implement particular abstract data types. The methods and processes disclosed herein may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the methods and processes disclosed herein includes a general purpose computing device in the form of a computer 110. Components of computer 110 may include, but are not limited to, a processing unit 120, a system memory 130, and a system bus 121 that couples various system components including, but not limited to, system memory 130 to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media as used herein.

System memory 130 includes computer storage media in the form of volatile and/or nonvolatile memory such as read only memory (ROM) 131 and random access memory (RAM) 132. A basic input/output system 133 (BIOS) containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

Computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 141 is typically connected to system bus 121 through a non-removable memory interface such as interface 140, and magnetic disk drive 151 and optical disk drive 155 are typically connected to system bus 121 by a removable memory interface, such as interface 150.

The drives and their associated computer storage media discussed above and illustrated in FIG. 2 provide storage of computer readable instructions, data structures, program modules and other data for computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to processing unit 120 through a user input interface 160 that is coupled to system bus 121, but may be connected by other interface and bus structures, such as a parallel port, game port or a universal serial bus (USB). A monitor 191 or other type of display device is also connected to system bus 121 via an interface, such as a video interface 190. In addition to monitor 191, computer 110 may also include other peripheral output devices such as speakers 197 and printer 196, which may be connected through an output peripheral interface 195.

Computer 110 may operate in a networked environment using logical connections to one or more remote computers, such as a remote computer 180. Remote computer 180 may be a personal computer, a server, a router, a network PC, a peer device or other common network node, and typically includes many or all of the elements described above relative to computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, computer 110 is connected to LAN 171 through a network interface or adapter 170. When used in a WAN networking environment, computer 110 typically includes a modem 172 or other means for establishing communications over WAN 173, such as the Internet. Modem 172, which may be internal or external, may be connected to system bus 121 via a user input interface 160, or other appropriate mechanism. In a networked environment, program modules depicted relative to computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Methods and processes disclosed herein may be implemented using one or more application programs including, but not limited to, a server system software application (e.g., WINDOWS SERVER SYSTEM™ software application), a search ranking application, and an application for generating, maintaining and storing usage data of documents within a network space (e.g., WINDOWS® SHAREPOINT® Services application), any one of which could be one of numerous application programs designated as application programs 135, application programs 145 and remote application programs 185 in exemplary system 100.

As mentioned above, those skilled in the art will appreciate that the disclosed methods of generating a document relevance score for a given document may be implemented in other computer system configurations, including hand-held devices, multiprocessor systems, microprocessor-based or programmable consumer electronics, networked personal computers, minicomputers, mainframe computers, and the like. The disclosed methods of generating a document relevance score for a given document may also be practiced in distributed computing environments, where tasks are performed by remote processing devices that are linked through a communications network. In a distributed computing environment, program modules may be located in both local and remote memory storage devices.

Implementation of Exemplary Embodiments

As discussed above, methods of determining a document relevance score for a document on a network are provided. The disclosed methods may rank a document on a network utilizing a ranking function that takes into account a document usage value of each document on the network.

The disclosed methods of determining a document relevance score for a document on a network may comprise a number of steps. In one exemplary embodiment, the method of determining a document relevance score for a document on a network comprises the steps of assigning an actual usage value ($U_A$) to one or more documents on a network comprising N documents, wherein the actual usage value ($U_A$) is based on actual usage data maintained and stored on a server; if less than N documents are assigned an actual usage value ($U_A$), assigning a default usage value ($U_D$) to the documents that do not have actual usage data associated therewith; and using the usage value (i.e., $U_A$ or $U_D$) for each document to determine the document relevance score of a given document on the network.

As used herein, the term "actual usage data" represents one or more types of data associated with the "usage" of the document by one or more users. Types of actual usage data for a given document or set of documents may include, but are not limited to, the number of document views by all users within a given period of time, the average number of document views per user within a given period of time, total time spent on a particular document within a given period of time, average time spent on a particular document within a given period of time, etc. The given period of time may be, for example, last week, last month, last year, the lifetime of the document, or any other desired period of time.

The steps of generating, maintaining and storing document usage data or statistics for documents within a network space may be performed by application code commonly found on computing systems. Document usage data is generated, maintained and stored independently of a given search query or search engine, and is typically generated, maintained and stored by application code on the server that maintains the document (or page) and makes the document (or page) available to a user. Suitable application programs for generating, maintaining and storing document usage data or statistics include, but are not limited to, WINDOWS® SHAREPOINT® Services and other similar application programs.

Document usage data stored and maintained on these service sites, as well as other web sites performing a similar function, may be accessed using application code as discussed above. For example, document usage data may be accessed from a given web site (e.g., a WINDOWS® SHAREPOINT® Services site) via (i) a special application programming interface (API), (ii) a web service request, or (iii) by requesting an administration web page that returns usage data for every URL on the web site.

The disclosed methods of determining a document relevance score for a document on a network may comprise a number of additional steps including, but not limited to, monitoring one or more documents within a network space for actual document usage; storing actual document usage data for one or more documents in a local or remote data storage file; calculating an actual usage value ($U_A$) for a document based on actual usage data for the document or a folder containing the document; storing actual usage values ($U_A$) for one or more documents in a local or remote data storage file; requesting stored document usage data or actual usage values ($U_A$) from a local or remote data storage file (e.g., a request for such data from a search engine after a specific search query by a user); retrieving actual document usage data or an actual usage value ($U_A$) for one or more documents from a local or remote data storage file; and optionally, merging a document usage value (i.e., actual or default) with one or more additional document properties to determine a document relevance score for a document.

Figure 3:
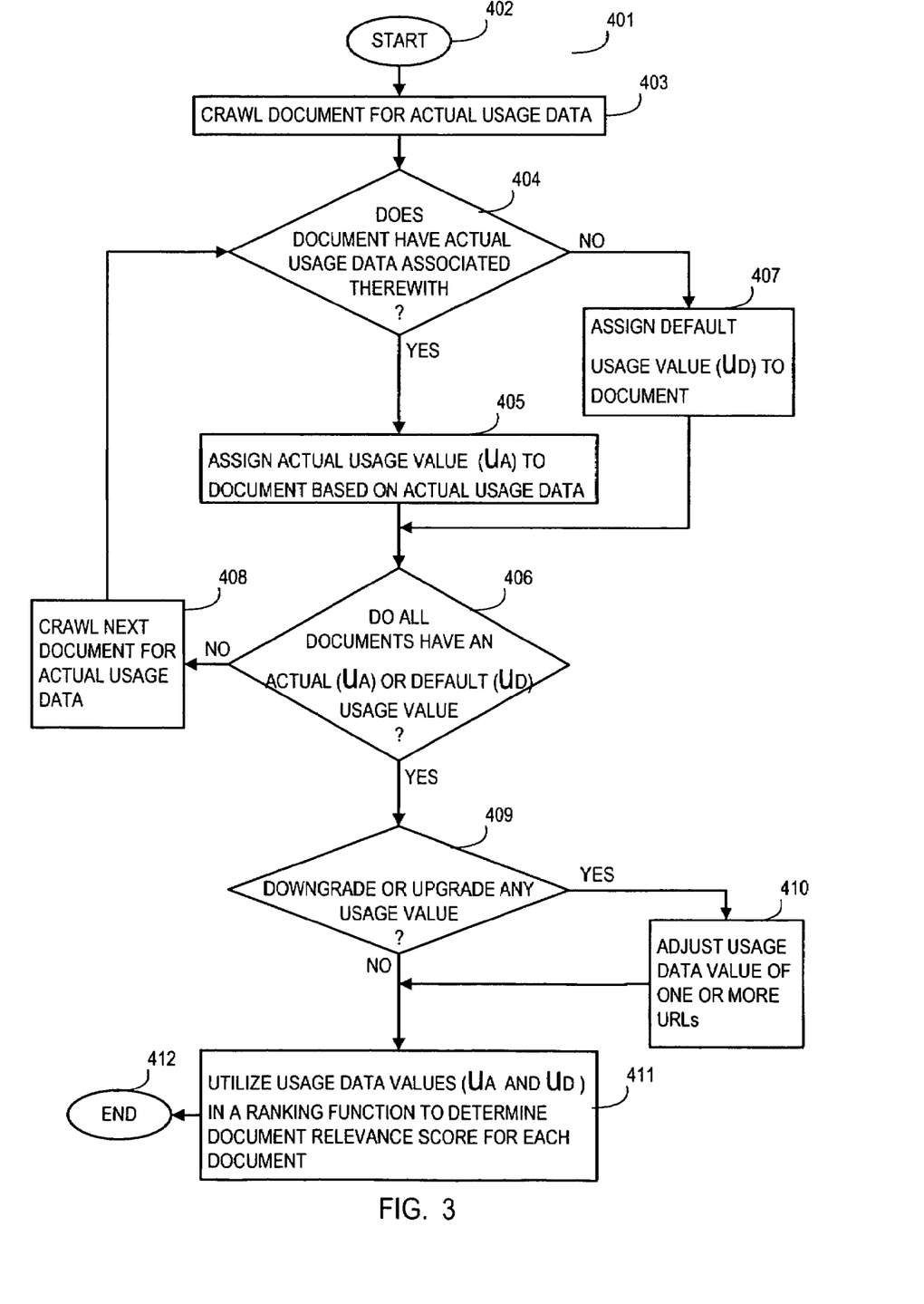
FIG. 3 represents a logic flow diagram showing exemplary steps in an exemplary method of determining document relevance scores for documents on a network.

FIGS. 3 represents a logic flow diagram showing exemplary steps in an exemplary method of providing actual or default usage values for documents on a network followed by an optional downgrading/upgrading procedure by a system administrator. As shown in FIG. 3, exemplary method 401 starts at block 402 and proceeds to step 403. In step 403, a first document on the network is crawled for actual usage data.

The step of crawling a first document for actual usage data (step 403) may be performed using a crawler application capable of determining whether the first document has any actual usage data associated therewith, and if the first document has actual usage data associated therewith, retrieving the actual usage data. Suitable crawler applications for use in the disclosed methods of providing actual or default usage values for documents on a network include, but are not limited to, crawler applications described in U.S. Pat. Nos. 6,463,455 and 6,631,369, the subject matter of both of which is hereby incorporated in its entirety by reference.

As discussed above, the actual usage data may be obtained from one or more files that store actual usage data for one or more documents on a network. The actual usage data may be stored, along with the document, as a document component, or may be stored in a data storage file separate from the actual document. Suitable remote storage systems include, but are not limited to, WINDOWS® SHAREPOINT® Services (WSS) products commercially available from Microsoft Corporation (Redmond, Wash.), as well as any other similar remote storage system. For example, the WSS remote storage system records actual usage data including, for example, the number of requests to every document on a given network across all users, and produces statistics of number of clicks per document during the last week, the last month, the last year, or the overall lifetime of the document, or any other period of time. Further, as noted above, it should be understood that the methods disclosed herein are not limited to a WSS remote storage system, but may utilize a WSS remote storage system or any other similar document data system in the disclosed methods.

Once the document is crawled, exemplary method 401 proceeds to decision block 404. At decision block 404, a determination is made by application code as to whether the document has actual usage data associated therewith. If a decision is made that the document has actual usage data associated therewith, exemplary method 401 proceeds to step 405, wherein a usage value based on actual usage ($U_A$) is assigned to the document. The actual usage value ($U_A$) may be determined using one or more components of the actual usage data associated with the document. For example, in some embodiments, the actual usage value ($U_A$) assigned to the document may be related only to the number of users viewing the document. In other embodiments, the actual usage value ($U_A$) assigned to the document may be related to the number of document views by all users within a given period of time, the average number of document views per user within a given period of time, total time spent on a particular document within a given period of time, average time spent on a particular document within a given period of time, or a combination of any of the above criteria, wherein the given period of time comprises last week, last month, last year, the lifetime of the document, or any other desired period of time.

In some cases, the actual usage data associated with a given document suggests that the document was not used or viewed during a given time period. In such a case, the document could be assigned a usage value ($U_A$) equal to zero to indicate no usage during the time period; however, typically, usage values ($U_A$) based on actual use or no actual use are assigned a number other than zero.

Further, in some cases, actual usage data may be associated with a set of documents as oppose to individual documents. For example, a folder may contain a set of documents, and an associated server may only track usage data related to accessing (i.e., use of) the folder, and not the individual documents within the folder. In this embodiment, if there is actual usage data associated with a folder, a usage value ($U_A$) may be provided for each document within the folder based on the actual usage data of the folder. Typically, each usage value ($U_A$) will be the same for each document within the folder; however, different usage values ($U_A$) may be assigned to different documents within a folder if so desired.

From step 405, exemplary method 401 proceeds to decision block 406 described below.

Returning to decision block 404, if a decision is made that the document does not have actual usage data associated therewith, exemplary method 401 proceeds to step 407, wherein a default usage value ($U_D$) is assigned to the document. For example, a default usage value ($U_D$) may be assigned to a document that is part of a web site that does not maintain document usage data. The default usage value ($U_D$) assigned to the document may be used to provide an initial importance to the document relative to documents having actual usage data. For example, if a higher usage value for a given document indicates relative importance of the document within the network, assigning a lower default usage value ($U_D$) to the document downgrades the importance of the document relative to other documents on the network.

In one exemplary embodiment wherein a higher usage value for a given document indicates relative importance of the document within the network, the default usage value ($U_D$) assigned to the document may be relative to actual usage values ($U_A$) assigned to other documents on the network. For example, in order to lower the relative importance of the document, a default usage value ($U_D$) may be assigned to the document, wherein the default usage value ($U_D$) is less than any actual usage value ($U_A$) assigned to other documents on the network as described above. If it is desired to increase the relative importance of the document, a default usage value ($U_D$) may be assigned to the document, wherein the default usage value ($U_D$) is greater than any actual usage value ($U_A$) assigned to other documents on the network or greater than some of the actual usage values ($U_A$) assigned to some of the other documents on the network.

In other embodiments, a default usage value ($U_D$) may be assigned to a document without actual usage data so that the document is given an average relative importance compared to documents having an assigned actual usage value ($U_A$). For example, in this embodiment, default usage values ($U_D$) for documents without actual usage data may range from a minimum assigned actual usage value ($U_{Amin}$) to a maximum assigned actual usage value ($U_{Amax}$), or be within a specific range between the minimum assigned actual usage value ($U_{Amin}$) and the maximum assigned actual usage value ($U_{Amax}$). In this embodiment, documents without actual usage data are provided with an average relative importance, suggesting medium usage, compared to documents that have actual usage data associated therewith.

From step 407, exemplary method 401 proceeds to decision block 406. At decision block 406, a determination is made by application code as to whether all of the documents on a network have an actual ($U_A$) or default ($U_D$) usage value. If a decision is made that all of the documents on a network do not have an actual ($U_A$) or default ($U_D$) usage value, exemplary method 401 proceeds to step 408, wherein the next document is crawled for actual usage data. From step 408, exemplary method 401 returns to decision block 404 and proceeds as discussed above.

Returning to decision block 406, if a determination is made by application code that all documents on the network have an actual ($U_A$) or default ($U_D$) usage value, exemplary method 401 proceeds to decision block 409. At decision block 409, a determination is made by a system administrator whether to downgrade any actual ($U_A$) or default ($U_D$) usage values in order to more closely represent the importance of a given document within a network space. If a decision is made to downgrade one or more actual ($U_A$) or default ($U_D$) usage values in order to more closely represent the importance of one or more documents within a network space, exemplary method 401 proceeds to step 410, wherein the actual ($U_A$) or default ($U_D$) usage value of one or more documents (or URLs) are adjusted either negatively or positively. From step 410, exemplary method 401 proceeds to step 411 described below.

Returning to decision block 409, if a decision is made not to downgrade (or upgrade) one or more actual ($U_A$) or default ($U_D$) usage values, exemplary method 401 proceeds directly to step 411. In step 411, the actual ($U_A$) and default ($U_D$) usage values are utilized in a ranking function to determine an overall document relevance score for each document within a network space. From step 411, exemplary method 401 proceeds to end block 412.

Once all actual ($U_A$) and default ($U_D$) usage values have been determined and optionally downgraded (or optionally upgraded), if so desired, the actual ($U_A$) or default ($U_D$) usage value for each document may be used as a parameter in a ranking function to provide a document relevance score for each document. Such a document relevance score may be used to rank search results of a search query. An exemplary method of ranking search results generated using a ranking function containing a document usage value parameter is shown in FIG. 4.

Figure 4:
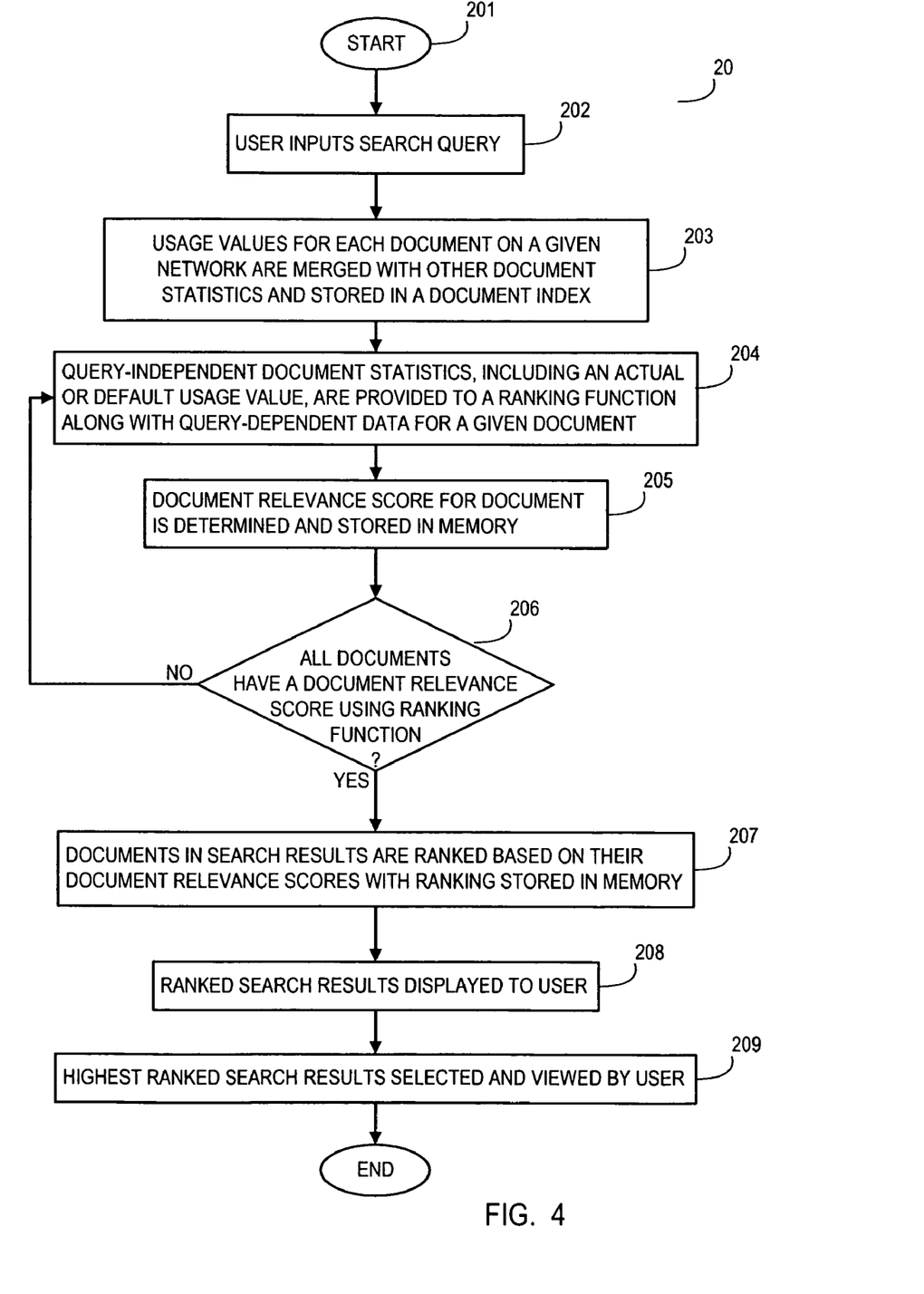
FIG. 4 represents a logic flow diagram showing exemplary steps in a method of ranking search results generated using a ranking function containing a document usage parameter.

FIG. 4 provides a logic flow diagram showing exemplary steps in exemplary method 20, wherein exemplary method 20 comprises a method of ranking search results generating using a ranking function containing a usage value parameter. As shown in FIG. 4, exemplary method 20 starts at block 201 and proceeds to step 202. In step 202, a user requests a search by inputting a search query. Prior to step 202, actual or default usage values for each of the documents on the network have previously been calculated. From step 202, exemplary method 20 proceeds to step 203.

In step 203, the actual or default usage value for each document on a network is merged with any other document statistics (e.g., other query-independent statistics) for each document stored in the index. Merging the actual or default usage values with other document statistics allows for a faster query response time since all the information related to ranking is clustered together. Accordingly, each document listed in the index has an associated actual or default usage value after the merge. Once the merge is complete, exemplary method 20 proceeds to step 204.

In step 204, query-independent document statistics for a given document, including a usage parameter, are provided as a component of a ranking function. Query-dependent data is also provided for the given document, typically as a separate component of the ranking function. The query-dependent data or content-related portion of the ranking function depends on the actual search terms and the content of the given document.

In one embodiment, the ranking function comprises at least one query-independent (QID) component comprises a usage parameter. In one embodiment, the query-independent (QID) component may be represented by the following equation:

$$QID(doc) = w_u \frac{k_u U}{k_u + U} \quad (1)$$

wherein:

U represents an actual usage value or a default usage value; and $w_u$ and $k_u$ represent tuning parameters for the usage value. In a further embodiment, the query-independent (QID) component may be represented by the following equation:

$$QID(doc) = w_u U + k_u \quad (2)$$

wherein:

U represents an actual usage value or a default usage value; and $w_u$ and $k_u$ represent tuning parameters for the usage value. In yet a further embodiment, the query-independent (QID) component may be represented by the following equation:

$$QID(doc) = w_u [1 + \exp(-k_u U - B)] + C \quad (3)$$

wherein:

U represents an actual usage value or a default usage value; and $w_u$, $k_u$, B and C represent tuning parameters (i.e., scalar constants) for the usage value.

In a further embodiment, the ranking function comprises a sum of the above-described query-independent (QID) component and at least one query-dependent (QD) component, such as $$Score=QD(doc,query)+QID(doc)$$

The QD component can be any document scoring function. In one embodiment, the QD component corresponds to a field weighted scoring function described in U.S. patent application Ser. No. 10/804,326 entitled "FIELD WEIGHTING IN TEXT DOCUMENT SEARCHING," filed on Mar. 18, 2004, the subject matter of which is hereby incorporated in its entirety by reference. As provided in U.S. patent application Ser. No. 10/804,326, one equation that may be used as a representation of the field weighted scoring function is as follows:

$$QD(doc, query) = \sum \frac{wtf'(k_1+1)}{k_1+wtf'} \times \log\left(\frac{N}{n}\right)$$

wherein:

wtf' represents a weighted term frequency or sum of term frequencies of given terms in the search query multiplied by weights across all fields (e.g., the title, the body, etc. of the document) and normalized according to the length of each field and the corresponding average length, N represents a number of documents on the network, n represents a number of documents containing a query term, and $k_1$ is a tunable constant.

The above terms and equation are further described in detail in U.S. patent application Ser. No. 10/804,326, the subject matter of which is hereby incorporated in its entirety by reference.

In some embodiments, the ranking function may further comprise a QID component that takes into account (i) a click distance value as determined by the methods disclosed in U.S. patent application Ser. No. 10/955,983 entitled "SYSTEM AND METHOD FOR RANKING SEARCH RESULTS USING CLICK DISTANCE" filed on Aug. 30, 2004, (ii) a biased click distance value as determined by the methods disclosed in U.S. patent application Ser. No. 11/206,286 entitled "RANKING FUNCTIONS USING A BIASED CLICK DISTANCE OF A DOCUMENT ON A NETWORK" filed on Aug. 15, 2005, the subject matter of both of which is incorporated herein by reference in its entirety, (iii) a URL depth of a document, or (iv) a combination of (i) or (ii) and (iii). For example, this optional additional QID component may comprise a function as follows:

$$QID(doc) = w_{cd} \frac{k_{cd}}{k_{cd} + \frac{CD}{b_{cd}\frac{CD}{k_{ew}} + b_{ud}UD}}$$

wherein:

$w_{cd}$ represents a weight of a query-independent component such as a component containing a click distance or biased click distance parameter, $b_{cd}$ represents a weight of a click distance or biased click distance relative to the URL depth, $b_{ud}$ represents a weight of a URL depth, CD represents a computed or assigned click distance or biased click distance for a document, $k_{ew}$ represents a tuning constant that is determined by optimizing the precision of the ranking function, similar to other tuning parameters (i.e., $k_{ew}$ may represent the edge weight value when all edges have the same edge weight value, or $k_{ew}$ may represent the average or mean edge value when edge weight values differ from one another), UD represents a URL depth, and $k_{cd}$ is the click distance saturation constant.

The weighted terms ($w_{cd}$, $b_{cd}$, and $b_{ud}$) assist in defining the importance of each of their related terms (i.e., the component containing a click distance or biased click distance parameter, the click distance or biased click distance value for a given document, and the URL depth of the given document respectively) and ultimately the outcome of the scoring function.

The URL depth ((UD)) is an optional addition to the above-referenced query-independent component to smooth the effect that the click distance or biased click distance value may have on the scoring function. For example, in some cases, a document that is not very important (i.e., has a large URL depth) may have a short click distance or biased click distance value. The URL depth is represented by the number of slashes in a document's URL. For example, www.example.com\d1\d2\d3\d4.htm includes four slashes and would therefore have a URL depth of 4. This document however, may have a link directly from the main page www.example.com giving it a relatively low click distance or biased click distance value. Including the URL depth term in the above-referenced function and weighting the URL depth term against the click distance or biased click distance value compensates for a relatively high click distance or biased click distance value to more accurately reflect the document's importance within the network. Depending on the network, a URL depth of 3 or more may be considered a deep link.

In one embodiment, the ranking function used to determine a document relevance score for a given document comprises a function as follows:

$$Score = \sum \frac{wtf'(k_1+1)}{k_1+wtf'} \times \log\left(\frac{N}{n}\right) + w_{cd} \frac{k_{cd}}{k_{cd} + \frac{CD}{b_{cd}\frac{CD}{k_{ew}} + b_{ud}UD}} + w_u \frac{k_u U}{k_u + U}$$

wherein the terms are as described above.

In other embodiments, the URL depth may be removed from the ranking function or other components may be added to the ranking function to improve the accuracy of the query-dependent component, the query-independent component, or both. Furthermore, the above-described query-independent component containing a usage parameter may be incorporated into other ranking functions (not shown) to improve ranking of search results.

Once document statistics for a given document are provided to a ranking function in step 204, exemplary method 20 proceeds to step 205. In step 205, a document relevance score is determined for a given document, stored in memory, and associated with the given document. From step 205, exemplary method 20 proceeds to decision block 206.

At decision block 206, a determination is made by application code whether a document relevance score has been calculated for each document within a network. If a determination is made that a document relevance score has not been calculated for each document within a network, exemplary method 20 returns to step 204 and continues as described above. If a determination is made that a document relevance score has been calculated for each document within a network, exemplary method 20 proceeds to step 207.

In step 207, the search results of the query comprising numerous documents are ranked according to their associated document relevance scores. The resulting document relevance scores take into account the actual or default usage value of each of the documents within the network. Once the search results are ranked, exemplary method 20 proceeds to step 208 where ranked results are displayed to a user. From step 208, exemplary method 20 proceeds to step 209 where highest ranked results are selected and viewed by the user. From step 209, exemplary method 20 proceeds to step 210 where exemplary method 20 ends.

In addition to the above-described methods of generating a document relevance score for documents within a network and using document relevance scores to rank search results of a search query, computer readable medium having stored thereon computer-executable instructions for performing the above-described methods are also disclosed herein.

Computing systems are also disclosed herein. An exemplary computing system contains at least one application module usable on the computing system, wherein the at least one application module comprises application code loaded thereon, wherein the application code performs a method of generating a document relevance score for documents within a network. The application code may be loaded onto the computing system using any of the above-described computer readable medium having thereon computer-executable instructions for generating a document relevance score for documents within a network and using document relevance scores to rank search results of a search query as described above.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the disclosed methods, computer readable medium, and computing systems should be assessed as that of the appended claims and any equivalents thereto.

What is claimed is:

1. A computer readable medium having stored thereon computer executable instructions comprising:

instructions for ranking documents on a network, said computer-executable instructions utilizing a ranking function invoked for a user query of the documents that comprises one or more query independent components, wherein at least one query-independent component includes a usage parameter that takes into account server-generated, server-stored usage data for one or more documents on the network, the usage data having been generated and stored by a network storage system managing and providing users with network access to the documents, the usage data comprising measurements of actual user interaction via the network storage system with the one or more documents on the network such that the usage data of a document reflects query-independent interactive usage of the document by a plurality of users via the network storage system, said computer executable instructions also assigning a score generated by the ranking function to rank documents on the network, said score being used to rank documents in order, the computer-executable instructions further comprising instructions for accepting a search inquiry comprising a search string inputted by a user, conducting a search of the documents on the network to generate search results comprising multiple documents, ranking the multiple documents of the search results using the ranking function to generate ranked search results such that the documents are ranked according to both their respective usage data and their relevance to the search string, and providing the ranked search results to the user.

2. The computer readable medium of claim 1, wherein a usage value of a document comprises (i) an actual usage value based on actual usage data maintained by a server or (ii) a default usage value that is not based on actual usage data.

3. The computer readable medium of claim 1, wherein the at least one query-independent component is represented by a formula:

$$QID(doc) = w_u \frac{k_u U}{k_u + U}$$

wherein:
U represents an actual usage value or a default usage value; and
$w_u$, and $k_u$ represent tuning parameters for the usage value.

4. The computer readable medium of claim 1, wherein the at least one query-independent component includes both (i) the usage parameter and (ii) a click distance or biased click distance parameter.

5. The computer readable medium of claim 1, wherein the at least one query-independent component includes both the usage parameter and a URL depth parameter.

6. The computer readable medium of claim 1, wherein the score for each document is generated using a formula:

$$\text{Score} = \sum \frac{wtf'(k_1+1)}{k_1 + wtf'} \times \log\left(\frac{N}{n}\right) + w_{cd} \frac{k_{cd}}{k_{cd} + \frac{\frac{CD}{k_{ew}} + b_{ud}UD}{b_{cd} + b_{ud}}} + w_u \frac{k_u U}{k_u + U}$$

wherein:
wtf' represents a weighted term frequency,
N represents a number of documents on the network,
n represents a number of documents containing a query term,
$w_{cd}$ represents a weight of a query independent component,
$b_{cd}$ represents a weight of a click distance,
$b_{ud}$ represents a weight of a URL depth,
CD represents a computed click distance or assigned biased click distance for a document,
$k_{ew}$ represents a tuning constant related to edge weights,
UD represents a URL depth,
U represents an actual usage value or a default usage value,
$w_u$ and $k_u$ represent tuning parameters for the usage value, and
$k_{cd}$ and $k_1$ are constants.

7. The computer readable medium of claim 1, further comprising computer-executable instructions for enabling an administrator to manually adjust ranking results generated by the ranking function.

8. A computing system containing at least one application module usable on the computing system, wherein the at least one application module comprises application code loaded thereon from the computer readable medium of claim 1.

9. A computer readable medium having stored thereon computer executable instructions comprising instructions for ranking documents on a network, said computer executable instructions utilizing a ranking function that comprises one or more query independent components, wherein at least one query-independent component includes a usage parameter that takes into account server-generated, server-stored usage data for one or more documents on the network, the usage data comprising measurements of actual user interaction with the one or more documents on the network, said computer executable instructions also assigning a score generated by the ranking function to rank documents on the network, said score being used to rank documents in order, wherein the usage data comprises usage values of respective documents, and wherein the usage value of a document is dependent on one or more usage related properties the document or a folder containing a set of documents, said one or more usage-related properties comprising a total number of document or folder views by users within a given period of time, an average number of document or folder views per user within a given period of time, a total time spent on a particular document or folder within a given period of time, an average time spent on a particular document or folder within a given period of time, wherein the given period of time comprises last week, last month, last year, a lifetime of the document or folder, or any other period of time.

10. A computer readable medium according to claim 9, wherein the one or more usage related properties comprises a total number of document or folder views by users within a given period of time.

11. A computer readable medium according to claim 9, wherein the one or more usage related properties comprises an average number of document or folder views per user within a given period of time.

12. A computer readable medium according to claim 9, wherein the one or more usage related properties comprises a total time spent on a particular document or folder within a given period of time.

13. A computer readable medium according to claim 9, wherein the one or more usage related properties comprises an average time spent on a particular document or folder within a given period of time.

14. A computer implemented method for ranking documents on a network, the method comprising:

providing a ranking function that comprises one or more query-independent components, wherein at least one query independent component includes a usage parameter that takes into account server generated, server-stored usage data for one or more documents on the network, the usage data comprising measurements of actual user interaction with the one-or more documents on the network; and assigning a score generated by the ranking function to rank documents on the network, said score being used to rank documents in order, wherein the usage value is dependent on one or more usage related properties of a document or a folder containing a set of documents, said one or more usage-related properties comprising a total number of document or folder views by users within a given period of time, an average number of document or folder views per user within a given period of time, a total time spent on a particular document or folder within a given period of time, an average time spent on a particular document or folder within a given period of time, wherein the given period of time comprises last week, last month, last year, a lifetime of the document or folder, or any other period of time.

* * * * *

UNITED STATES PATENT AND TRADEMARK OFFICE
CERTIFICATE OF CORRECTION

| | | |
|---|---|---|
| PATENT NO. | : 7,499,919 B2 | |
| APPLICATION NO. | : 11/231955 | |
| DATED | : March 3, 2009 | |
| INVENTOR(S) | : Dmitriy Meyerzon et al. | |

It is certified that error appears in the above-identified patent and that said Letters Patent is hereby corrected as shown below:

In column 13, line 51, in Claim 1, delete "query independent" and insert -- query-independent --, therefor.

In column 14, line 51, in Claim 6, delete "query independent" and insert -- query-independent --, therefor.

In column 15, line 6, in Claim 9, delete "computer executable" and insert -- computer-executable --, therefor.

In column 15, line 9, in Claim 9, delete "query independent" and insert -- query-independent --, therefor.

In column 15, line 20, in Claim 9, delete "usage related" and insert -- usage-related --, therefor.

In column 15, line 32, in Claim 10, delete "usage related" and insert -- usage-related --, therefor.

In column 15, line 36, in Claim 11, delete "usage related" and insert -- usage-related --, therefor.

In column 16, line 2, in Claim 12, delete "usage related" and insert -- usage-related --, therefor.

In column 16, line 6, in Claim 13, delete "usage related" and insert -- usage-related --, therefor.

In column 16, line 14, in Claim 14, delete "query independent" and insert -- query-independent --, therefor.

In column 16, line 15, in Claim 14, delete "server generated," and insert -- server-generated, --, therefor.

In column 16, line 19, in Claim 14, delete "one-or" and insert -- one or --, therefor.

Signed and Sealed this
Third Day of May, 2011

David J. Kappos
*Director of the United States Patent and Trademark Office*

In column 16, line 24, in Claim 14, delete "usage related" and insert -- usage-related --, therefor.